though such techniques increase the cohesive energy density of the resulting thermoplastic polyurethane, the MEK-solubility characteristic has been sacrificed to such an extent that it is now necessary to resort to mixtures of MEK and strong solvents, e.g., N,N-dimethylformamide and tetrahydrofuran, or solely the strong solvents themselves. However, such strong solvents suffer various disadvantages as high cost (in relation to MEK), extreme toxicity, poor evaporation, etc. In fact, thermoplastic polyurethane solutions and mixtures of organic solvents containing only about 5 weight percent N,N-dimethylformamide are not viewed with favor by the worker in the adhesive and coating arts in light of the disadvantages connected with them.

United States Patent Office 3,761,439
Patented Sept. 25, 1973

3,761,439
THERMOPLASTIC POLYURETHANES SOLUBLE IN METHYL ETHYL KETONE BASED ON POLY (CAPROLACTONE) DIOLS
Robert J. Ward, Somerville, N.J., and Frank E. Critchfield, South Charleston, W. Va., assignors to Union Carbide Corporation, New York, N.Y.
No Drawing. Filed Oct. 15, 1971, Ser. No. 189,722
Int. Cl. C08g 22/06, 22/44, 51/34
U.S. Cl. 260—32.8 N     5 Claims

ABSTRACT OF THE DISCLOSURE

This invention relates to improved thermoplastic polyurethanes which are soluble in methyl ethyl ketone at room temperature. Such polyurethanes exhibit improved elevated temperature performance especially in the adhesive area. They are prepared by reacting poly(oxycaproyl) diol, p,p'-diphenylmethane diisocyanate, and a defined mixture of alpha, omega-alkanediols.

This invention relates to the manufacture of novel thermoplastic polyurethanes which are soluble at room temperature in methyl ethyl ketone. In one aspect the invention relates to organic solutions of thermoplastic polyurethanes which give films, coatings, adhesives, etc., exhibiting improved elevated temperature performance.

Polyurethane products can be prepared by reacting polymeric polyols, polyisocyanate compounds, and polyfunctional chain extenders which are characterized by active-hydrogen containing groups such as hydroxyl, primary amino, secondary amino, and mixtures thereof. Depending upon the technique and procedure employed as well as the choice and concentration of the reactants and other ingredients, if any, there can be produced products which are known to the art as millable polyurethanes, thermoplastic polyurethanes, castable polyurethanes, thermoplastic processable polyurethanes, etc. The use of water or halocarbon blowing agent in polyurethane-producing formulations will produce porous polyurethanes of widely varying cell structure and density which can range from a dense microcellular structure to foamed products which have a density less than two pounds per cubic foot.

The so-called "true thermoplastic" polyurethanes which are soluble in certain liquid organic media are prepared by using difunctional reactants, i.e., a polymeric diol, an organic diisocyanate, and a difunctional chain extender, in which the ratio of total hydroxyl equivalents to isocyanato equivalents (oftentimes expressed as groups) has a value of about one. Solutions of thermoplastic polyurethanes in methyl ethyl ketone (hereinafter oftentimes referred to as MEK) are known in the prior art, and the use of such solutions are favored by artisans in the adhesive and coating areas in view of their low cost, low toxicity, good evaporation characteristic, etc. However, these MEK-soluble thermoplastic polyurethanes give relatively poor elevated temperature performance such as inferior peel strength and dead-load hot strength. To increase the elevated temperature performance characteristics of such polyurethanes one must increase their cohesive energy density, for instance, by incorporating additional urethane groups along the polymeric chain thereof. Though such techniques increase the cohesive energy density of the resulting thermoplastic polyurethane, the MEK-solubility characteristic has been sacrificed to such an extent that it is now necessary to resort to mixtures of MEK and strong solvents, e.g., N,N-dimethylformamide and tetrahydrofuran, or solely the strong solvents themselves. However, such strong solvents suffer various disadvantages as high cost (in relation to MEK), extreme toxicity, poor evaporation, etc. In fact, thermoplastic polyurethane solutions and mixtures of organic solvents containing only about 5 weight percent N,N-dimethylformamide are not viewed with favor by the worker in the adhesive and coating arts in light of the disadvantages connected with them.

It has now been discovered that novel thermoplastic polyurethanes can be prepared which exhibit improved elevated temperature performance and which are soluble in MEK or mixtures of MEK and methyl $C_1$–$C_4$ alkyl ketone, e.g., acetone, at room temperature, e.g., about 25° C. and lower. This unexpected discovery is made possible by using, in the polyurethane-producing formulation, poly (oxycaproyl) diol as the polymeric diol, p,p'-diphenylmethane diisocyanate as the organic diisocyanate, and a well-defined mixture of omega-alkanediols as the chain extenders, and optionally, catalyst, surfactant, pigment, retarder, and other ingredients.

In a more defined aspect, the novel process is directed to the preparation of novel thermoplastic polyurethane products having improved elevated temperature performance and which are soluble at room temperature in MEK or MEK/methyl $C_1$–$C_4$ alkyl ketone mixtures, which comprises reacting (i) poly(oxycaproyl) diol, (ii) p,p'-diphenylmethane diisocyanate, and (iii) a defined mixture of alpha, omega-alkanediols as the chain extenders, (iv) wherein the over-all molar ratio of the poly(oxycaproyl) diol plus alpha, omega-alkanediol mixture to p,p'-diphenylmethane diisocyanate is about one, (v) wherein the molar ratio of said poly(oxycaproyl) diol to said p,p'-diphenylmethane diisocyanate is in the range of from about 1:1.5 to about 1:5, preferably from about 1:1.7 to about 1:2.5, and (vi) wherein the molar ratio of said poly(oxycaproyl) diol to said alpha, omega-alkanediol mixture is in the range of from about 1:0.5 to about 1:4, preferably from about 1:0.7 to about 1:1.5.

A mixture comprising at least two alpha, omega-alkanediols is employed as chain extenders in the practice of the novel process. The proportions are such that one alpha, omega-alkanediol component comprises from about 25 to about 75 weight percent of the diol mixture with the remainder (about 75 to about 25 weight percent) being comprised of one or more different alpha, omega-alkanediols; with the proviso that said alkanediol mixture can contain upwards to about 90 weight percent 1,6-hexanediol or upwards to about 80 weight percent ethylene glycol therein. The alkanediols are further characterized in that they contain from two to twelve carbon atoms and and are illustrated by ethylene glycol, 1,3-propanediol, 2,2-dimethyl-1,3-propanediol, diethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like.

The poly(oxycaproyl) diol component which is employed in the practice of the invention desirably has an average molecular weight in the range of from about 500 to about 4000, preferably from about 800 to about 3500, and is characterized by the recurring structural linear unit of the formula (I) 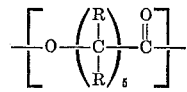

wherein each R individually represents hydrogen or lower alkyl, e.g., methyl, ethyl, n-propyl, isopropyl, n-butyl, isobutyl, and t-butyl, with the proviso that no more than three R substituents are groups other than hydrogen. It is preferred that the aforedescribed linear unit (I) is the oxycaproyl or oxypentamethylenecarbonyl unit, that is,

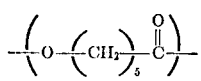

The aforedescribed recurring linear unit (I) is interconnected through the oxy groups (—O—) of one unit with the carbonyl group

of a second unit. In other words, the interconnection of these units does not involve the direct bonding of two carbonyl groups, i.e.,

The poly(oxycaproyl) diols which are characterized by recurring units (I) supra contain greater than 50 weight percent of such units, preferably greater than 75 weight percent, in the polymer. Minor amounts of other moieties or groups can be interspersed along the polymeric chain such as the urethane group,

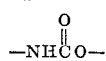

the oxyalkylene groups

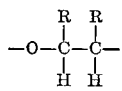

wherein R is hydrogen or lower alkyl, e.g., methyl, ethyl, etc.; the mono- and polyaromatic rings including fused and bridged rings such as phenylene, biphenylene, naphthylene, phenylene-alkylene-phenylene, and phenylene-alkylidene-phenylene; initiator moieties; etc.

The preparation of the poly(oxycaproyl) diols thus characterized with recurring units (I) supra is well-documented in the art, e.g., U.S. 3,169,945, U.S. 3,248,417, and U.S. 3,021,309 to U.S. 3,021,317. A general procedure involves reacting a molar excess of epsilon-caprolactone (and/or lower alkyl substituted epsilon-caprolacetone) with an initiator which contains two active hydrogen-containing groups, e.g., hydroxyl, primary amino, secondary amino, and mixtures thereof, such groups being capable of opening the lactone ring whereby it adds as an open chain to the site of the active hydrogen-containing group, at an elevated temperature, preferably in the presence of a catalyst such as tetrabutyltitanate, stannous octanoate, etc., for a period of time sufficient to produce the poly(oxycaproyl) diols. By carefully controlling the purity and molar ratio of the reactants, e.g., the epsilon-caprolactone reactant and the difunctional active hydrogen-containing initiator, there are produced poly(oxycaproyl) diols whose weight average molecular weight can range from about 500 to several thousand, e.g., 10,000 and greater. The poly(oxycaproyl) diols can also be prepared by reacting an epsilon-caprolactone and/or its oligomers and/or the corresponding hydroxyacid, e.g., a 6-hydroxycaproic acid, with a mixture comprising diol, or diol and dicarboxylic acid using a molar excess of diol with relation to the dicarboxylic acid. The water of esterification which results during the reaction can be removed via conventional techniques. Illustrative of the diols and dicarboxylic acid which can be used include ethylene glycol, propylene glycol, 2,2-dimethyl-1,3-propanediol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, sebacic acid, phthalic acid, and the like.

The novel thermoplastic polyurethane products may be prepared according to several different proceddures. In one typical procedure, the so-called "one shot" process, the mixture comprising poly(oxycaproyl) diol, p,p'-diphenylmethane diisocyanate, and mixture of alpha, omega-alkanediols, and other ingredients, if any, are simultaneously mixed and reacted at an elevated temperature. A second typical procedure involves the so-called "prepolymer" method in which the poly(oxycaproyl) diol is first reacted with the diisocyanate to form a diisocyanato-terminated prepolymer (commonly called "prepolymer") and subsequently reacting this prepolymer with the mixture of alpha, omega-alkanediols to produce the novel thermoplastic polyurethane products. The so-called "quasi-prepolymer" technique can also be used. Variations of the aforesaid procedures can be employed such as first reacting the mixture of alpha, omega-alkanediols with the diisocyanate and then reacting the resulting isocyanato-terminated reaction products with the poly(oxycaproyl) diol component.

The preparation of the novel thermoplastic polyurethane products desirably takes place at elevated temperatures, e.g., from about 40° C. to about 180° C. and higher. In many instances, a preferred reaction temperature range is from about 60° C. to about 160° C. The upper limit of the reaction temperature is realistically controlled by the thermal stability of the reactants and the reaction products whereas the lower limit is regulated to a practical degree, by the reaction rate. In general, the optimum reaction temperature employed will be significantly influenced by the choice and proportion of the reactants, the degree of cure desired, the use of a catalyst, and other factors.

In the preparation of the novel thermoplastic polyurethane products, the molar ratio of poly(oxycaproyl) diol to organic diisocyanate is from about 1:1.7 to about 1:2.5. With reference to the molar ratios of poly(oxycaproyl) diol to mixture of alpha, omega-alkanediols, it is generally desirable to employ from about 1:0.5 to about 1:4, and preferably from about 1:0.7 to about 1:1.5.

As indicated previously, the over-all molar ratio of poly(oxycaproyl) diol plus alpha, omega alkanediol mixture to p,p'-diphenylmethane diisocyanate is about one. Desirable results are obtained by employing an over-all molar ratio of poly(oxycaproyl) diol plus alpha, omega-alkanediol mixture to p,p'-diphenylmethane diisocyanate which is in the range of from about 0.95 to about 1.05. In lieu of expressing the proportion of the reactants by reference to the molar ratios employed in the polyurethane-forming formulation, essentially the same result is obtained by referring to hydroxyl equivalents (or hydroxyl groups) and isocyanato equivalents (or isocyanato groups). In the preferred thermoplastic polyurethane products of this invention, the proportion of such products which is attributable to the poly(oxycaproyl) diol component is from about 65 to about 95 weight percent.

The novel thermoplastic polyurethane products can be prepared in bulk or as a solution in MEK or mixtures of MEK and methyl $C_1$–$C_4$ alkyl ketone. In some instances such products can be prepared using acetone as the sole organic solvent. The reaction can be conducted for a period of time ranging from several minutes to several hours, e.g., from about 30 minutes to about 6 hours and longer. After this, the thermoplastic polyurethane product can be post cured, if necessary, at ambient temperatures for a period of several days, or at an elevated temperature for a lesser period of time.

The preparation of the novel polyurethane products via the solution route is desirably carried out by forming a mixture of poly(oxycaproyl) diol and the alpha, omega-alkanediols, and incrementally adding thereto p,p'-diphenylmethane diisocyanate. Ideally, the ratio of total hydroxyl equivalents to isocyanato equivalents (from the reactants) should be one in order to achieve high molecular weight linear thermoplastic polyurethane polymers ranging upwards to about 100,000 and greater.

However, since trace amounts of water and perhaps monofunctional reactive impurities are invariably present in the reactants and/or organic ketonic solvent, it becomes quite difficult to charge reactants to the reaction vessel in which the NCO:OH ratio calculates to exactly one. During the early stages of the reaction, the undercharging of the diisocyanate reactant produces hydroxyl-terminated linear polymers. The polymer molecular weight is then increased, under controlled and reproducible conditions, to the desired level by the continued incremental additions of the remainder of the diisocyanate reactant in the final stages of the reaction. Undesirable "side reactions" are also minimized by resorting to this technique. When the predetermined molecular weight of the polymer has been reached, as evidenced by the solution viscosity or reduced viscosity of the polymer per se, the reaction can be terminated, if desired, by the addition of a very small amount of monofunctional amine or alcohol, e.g., 250 to 1000 parts per million of the monofunctional component.

By the practice of the invention there can be produced novel solutions of thermoplastic polyurethane products in MEK or MEK/methyl $C_1$–$C_4$ alkyl ketone, the viscosity of which ranging from about 200 to about 300,000 centipoises, preferably from about 500 to about 100,000 centipoises. The total thermoplastic polyurethane content therein can range upwards to about 50 weight percent, and higher, based on the total weight of the solution. Novel solutions which contain from about 10 to about 30 weight percent of said thermoplastic polyurethane are generally satisfactory for many adhesive and coating applications. The weight average molecular of the novel thermoplastic polyurethanes per se can be upwards to about 300,000, and higher. Desirably, the weight average molecular weight is from about 20,000 to about 250,000, and preferably from about 40,000 to about 150,000.

Various compounds can be employed to catalyze or accelerate the isocyanato/hydroxyl reaction. Compounds which are oftentimes useful include the tertiary amines, phosphines, and various organic metallic compounds in which the metal can be bonded to carbon and/or other atoms such as oxygen, sulfur, nitrogen, halo, hydrogen and phosphorus. The metal moiety of the organic metallic compounds can be, among others, tin, titanium, lead, potassium, sodium, arsenic, antimony, bismuth, manganese, iron, cobalt, nickel, and zinc. Of those which deserve special mention are the organic metallic compounds which contain at least one oxygen to metal bond and/or at least one carbon to metal bond, especially wherein the metal moiety is tin, lead, bismuth, arsenic, or antimony. The tertiary amines, the organic tin compounds (which includes the organotin compounds), and the organic lead compounds are eminently preferred. Preferred subclasses of organic metallic compounds include the acylates, particularly the alkanoates, and alkoxides of Sn (II), Sn (IV), Pb (II), Ti (IV), Zn (IV), Co (II), Mn (II), Fe (III), Ni (II), K, and Na. An additional subclass which is extremely useful is the dialkyltin dialkanoates.

Specific catalysts include, by way of illustrations, 1,4-diazabicyclo[2.2.2] octane, N,N,N',N'-tetramethyl - 1,3-butanediamine, bis[2-(N,N-dimethylamino)ethyl] ether, bis[2-(N,N-dimethylamino) - 1 - methylethyl] ether, N-methylmorpholine, sodium acetate, potassium laurate, stannous octanoate, stannous oleoate, lead octanoate, tetrabutyl titanate, ferric acetylacetonate, cobalt, naphthenate, tetramethyltin, tributyltin chloride, tributyltin hydride, trimethyltin hydroxide, dibutyltin oxide, dibutyltin dioctanoate, dibutyltin dilaurate, butyltin trichloride, triethylstibine oxide, potassium hydroxide, sodium carbonate, magnesium oxide, stannous chloride, stannic chloride, bismuth nitrate. The catalyst is used in catalytically significant quantities. For instance, concentrations in the range of from about 0.001 weight percent, and lower, to about one weight percent, and higher, based on the total polyurethane-forming ingredients, have been found to be satisfactory.

The preparation of the isocyanato-terminated prepolymers, as intimated previously, result from the reaction of the poly(oxycaproyl) diol component with a molar excess of the organic diisocyanate. Equation II below illustrates the linear extension reaction involved:

(II)     HOLOH + excess $Y(NCO)_2$ ⟶

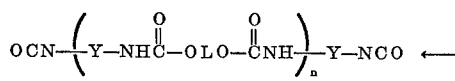

(i) wherein HOLOH is an abbreviated representation of the poly(oxycaproyl) diol component which has a weight average molecular weight of from about 500 to about 4000, preferably from about 800 to about 3500, and which is characterized by the recurring structural linear unit of the formula:

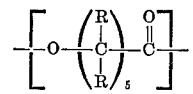

wherein each R individually can be hydrogen or lower alkyl, e.g., methyl, ethyl, propyl, butyl, etc., preferably hydrogen, with the proviso that no more than three R substituents are groups other than hydrogen; (ii) wherein $Y(NCO)_2$ represents p,p'-diphenylmethane diisocyanate; (iii) wherein $n$ is an integer greater than zero; (iv) wherein OLO is a bivalent radical resulting from the removal of the hydroxylic hydrogen atoms from said poly (oxycaproyl) diol; and (v) wherein Y represents the bivalent organic radical without the two isocyanato group from p,p'-diphenylmethane diisocyanate, i.e., bis(4-phenylene)methane.

It will be noted from Equation II supra that the use of an excess of diisocyanate provides an efficient means of control over the degree of linear extension of the polyurethane molecule. If the proportions of poly(oxycaproyl) diol and diisocyanate are chosen so that the number of reactive terminal hydroxyl groups from the former is equal to the number of reactive isocyanato groups from the latter, relatively long, high molecular weight chains would be formed.

During and after the preparation of the prepolymers it is oftentimes desirable to stabilize such prepolymers by the addition of retarders to slow down subsequent further polymerization or less desirable side-reactions such as, for example, allophanate formation. Retarders may be added to the organic diisocyanate, polymeric diol mixture, and/or prepolymer. Illustrative of the retarders suitable for the diol-diisocyanate reaction are hydrochloric acid, sulfuric acid, phosphoric acid, boric acid, acetyl chloride, para-toluenesulfonyl chloride, phosphorous trichloride, phosphorous oxychloride, sulfuryl chloride, thionyl chloride, and sulfur dioxide.

The prepolymer shown in Formula II supra can then be reacted through their free isocyanato groups with the hydroxy groups of the mixture comprising alpha, omega-alkanediols. In such reactions, the "active hydrogen" from said mixture is added to the isocyanato nitrogen of the organic diisocyanate. The remainder of said mixture becomes bonded to the carbonyl carbon. The following equations illustrate the chain extension reaction involved:

After reaction of the alpha, omega-alkanediol mixture with the prepolymer and any excess diisocyanate which may be present, the resulting novel polymeric product is a poly(oxycaproyl)-polyurethane being comprised essentially of structural units having the Formula III:

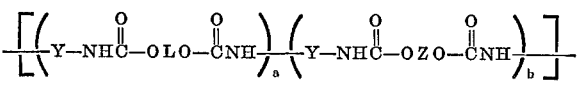

(i) wherein OLO represents the bivalent organic radical which results from the removal of both hydroxyl hydrogen atoms (the hydrogen from the hydroxyl (—OH groups) from poly(oxycaproyl) diol which has a weight average molecular weight in the range of from about 500 to about 4000, preferably from about 800 to about 3500, and which is characterized by the recurring structural linear unit of the formula:

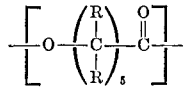

wherein each R individually can be hydrogen or lower alkyl, e.g., methyl, ethyl, propyl, butyl, etc., preferably hydrogen, with the proviso that no more than three R substituents are groups other than hydrogen;

(ii) wherein Y represents the bivalent organic radical which results from the removal of both isocyanato groups from p,p'-diphenylmethane diisocyanate, i.e., Y is bis(4-phenylene)methane;

(iii) wherein OZO represent bivalent organic radicals which result from the removal of the hydroxylic hydrogen atoms from a mixture comprising alpha, omega-$C_2$–$C_{12}$ alkanediols, the proportions being such that said mixture comprises from about 25 to about 75 weight percent of one alpha, omega-alkanediol component with the remainder being comprised of at least one different alpha, omega-alkanediol, with the proviso that said mixture can contain upwards to about 90 weight percent 1,6-hexanediol or upwards to about 80 weight percent ethylene glycol therein;

(iv) wherein the over-all molar ratio of the number of (OLO+OZO) to Y radicals in said product is about one;

(v) wherein $a$ is an integer greater than zero;

(vi) wherein $b$ is an integer greater than zero;

(vii) wherein the over-all ratio of the number of OLO to Y radicals in said product is in the range of from about 1:1.5 to about 1:5, preferably from about 1:17 to about 1:2.5, and (viii) wherein the over-all ratio of the number of OLO to OZO radicals in said product is in the range of from about 1:0.5 to about 1:4, preferably from about 1:0.7 to about 1:1.5.

Various terms, abbreviations, designations, methods, etc., used in this specification are explained hereinbelow.

The abbreviation "ASTM" stands for American Society for Testing Materials.

Peel strength (lbs./inch) vs. temperature was determined according to ASTM D–1876, 2"/minute, canvas to canvas.

MDI represents p,p'-diphenylmethane diisocyanate.
BDO represents 1,4-butanediol.
HDO represents 1,6-hexanediol.
NPG represents 2,2-dimethyl-1,3-propanediol.
EG represents ethylene glycol.

Polyol 2000 represents poly(oxycaproyl) diols which have number average molecular weights of about 2000 and which are prepared by reacting epsilon-caprolactone with diethylene glycol initiator at a molar ratio of about 17:1 in the presence of stannous dioctanoate as the catalyst therefor.

The viscosity (in centipoises) of the thermoplastic polyurethane solution (MEK) was determined on a Model RVF Brookfield Viscometer at room temperature, i.e., about 22° C. using Spindle No. 4 at 10–20 r.p.m. (0–20,000 centipoises) or Spindle No. 7 at 10 r.p.m. (20,000–400,000 centipoises).

The term "reduced viscosity" is a value obtained by dividing the specific viscosity by the concentration of the thermoplastic polyurethane polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. The reduced viscosities herein referred to are measured at a concentration of 0.2 gram of polymer in 100 milliliters of N,N-dimethylformamide at 25° C.

EXAMPLE 1

To a flask equipped with a thermometer, stirrer, reflux condenser, feed tank and nitrogen purge there were added Polyol A (225.3 grams, 0.116 mole), 1,4-butanediol (2.10 grams, 0.023 mole), 1,6-hexanediol (11.00 grams, 0.093 mole), dibutyltin dilaurate (0.03 gram), and 405 grams of anhydrous MEK. The mixture was heated to 60° C. and p,p'-diphenylmethane diisocyanate (57.3 grams, 0.228 mole) was added over a 20 minute period. At the end of the addition 40 grams of MEK was used to rinse any traces of the reactants from the feed tank into the reaction flask. The temperature of the reaction mixture was maintained at about 60° C. for one hour at which time an analysis for NCO content showed the level of NCO to be below 100 p.p.m. One gram of p,p'-diphenylmethane diisocyanate was then added to the flask. The temperature was maintained at about 60° C. for 30 minutes at which time the NCO content again analyzed below 100 p.p.m. A second gram of p,p'-diphenylmethane diisocyanate was added to the flask. Two hours later 247 grams of MEK was added to the flask followed by 0.05 gram of methanol. The resulting mixture was stirred well and discharged. There was obtained a MEK solution of poly(oxycaproyl)-polyurethane product which, at 20 weight percent concentration in MEK, possessed a solution viscosity of 2350 centipoises and a reduced viscosity of 1.04.

EXAMPLE 2

To a flask equipped with a thermometer, stirrer, reflux condenser, feed tank and nitrogen purge there were added Polyol A (226.9 grams, 0.116 mole), 1,4-butanediol (1.05 grams, 0.012 mole), 1,6-hexanediol (12.37 grams, 0.104 mole), dibutyltin dilaurate (0.03 gram), and 405 grams of anhydrous MEK. The mixture was heated to 60° C. and p,p'-diphenylmethane diisocyanate (57.3 grams, 0.228 mole) was added over a 20 minute period. At the end of the addition 40 grams of MEK was used to rinse any traces of the reactants from the feed tank into the reaction flask. The temperature of the reaction mixture was maintained at about 60° C. for one hour at which time an analysis for NCO content showed the level of NCO to be below 100 p.p.m. One gram of p,p'-diphenylmethane diisocyanate was then added to the flask. The temperature was maintained at about 60° C. for one hour at which time the NCO content again analyzed below 100 p.p.m. A second gram of p,p'-diphenylmethane diisocyanate was added to the flask. Three hours later 247 grams of MEK was added to the flask followed by 0.05 gram of methanol. The resulting mixture was stirred well and discharged. There was obtained a MEK solution of poly(oxycaproyl)-polyurethane product which, at 20 weight percent concentration in MEK, possessed a solution viscosity of 2,780 centipoises and a reduced viscosity of 1.19.

EXAMPLE 3

To a flask equipped with a thermometer, stirrer, reflux condenser, feed tank and nitrogen purge, there were added Polyol A (225.3 grams, 0.116 mole), 1,4-butanediol (8.40 grams, 0.093 mole), 1,6-hexanediol (2.75 grams, 0.023 mole), dibutyltin dilaurate (0.03 gram), and 401 grams of anhydrous methyl ethyl ketone. The mixture was heated to 60° C. and p,p'-diphenylmethane diisocyanate (57.3 grams, 0.228 mole) was added over a fifteen minute period. At the end of the addition 40 grams of MEK was used to rinse any traces of reactants from the feed tank into the reaction flask. The temperature of the reaction mixture was maintained at about 60° C. for one hour at which time an analysis for NCO content showed the level of NCO to be below 100 parts per million (p.p.m.). One gram of p,p'-diphenylmethane diisocyanate was then added to the flask. The temperature was maintained at about 60° C. for another hour at which time the NCO analyzed below 100 p.p.m. A second gram of p,p'-diphenylmethane diisocyanate was added to the flask. Thirty minutes later 247 grams of MEK was added to the flask and the temperature was maintained at 60° C. for 2 hours. The resulting mixture was stirred well and discharged. There was obtained a MEK solution of poly(oxycaproyl)-polyurethane product which, at 20 weight percent concentration in MEK, possessed a solution viscosity of 4800 centipoises and a reduced viscosity of 1.30. Upon standing at 25° C. for a period of one month, the solution gelled.

EXAMPLE 4

To a flask equipped with a thermometer, stirrer, reflux condenser, feed tank and nitrogen purge there were added Polyol A (225.3 grams, 0.116 mole), 1,6-hexanediol (6.88 grams, 0.058 mole), ethylene glycol (3.61 grams, 0.058 mole), dibutyltin dilaurate (0.03 gram), and 401 grams of anhydrous methyl ethyl ketone. The mixture was heated to about 60° C. and p,p'-diphenylmethane diisocyanate (57.3 grams, 0.228 mole) was added over a fifteen minute period. At the end of the addition 40 grams of MEK was used to rinse any traces of reactants from the feed tank into the reaction flask. The temperature of the reaction was maintained at about 60° C. for one hour at which time an analysis for NCO content showed the level of NCO to be below 100 parts per million. One gram of p,p'-diphenylmethane diisocyanate was then added to the flask. The temperature of the reaction mixture was maintained for 1 hour at which time the NCO content analyzed below 100 p.p.m. A second gram of p,p'-diphenylmethane diisocyanate was added to the reaction flask which was maintained at a temperature of 60° C. An hour later a third gram of p,p'-diphenylmethane diisocyanate was added. One hour after the third addition 247 grams of methyl ethyl ketone and 0.1 gram of methanol were added to the reaction mixture under agitation. There was obtained a MEK solution of poly(oxycaproyl)-polyurethane product which, at 20 weight percent concentration in MEK, possessed a solution viscosity of 5600 centipoises and a reduced viscosity of 1.22.

EXAMPLE 5

To a flask equipped with a thermometer, stirrer, reflux condenser, feed tank and nitrogen purge there was added Polyol A (225.3 grams, 0.116 mole), 1,4-butanediol (7.35 grams, 0.0815 mole), ethylene glycol (2.17 grams, 0.035 mole), dibutyltin dilaurate (0.03 gram), and 401 grams of anhydrous methyl ethyl ketone. The mixture was heated to 60° C. and p,p'-diphenylmethane diisocyanate (57.3 grams, 0.228 mole) was added over a fifteen minute period. At the end of the addition 40 grams of MEK was used to rinse any traces of reactants from the feed tank into the reaction flask. The temperature of the reaction was maintained at about 60° C. for one hour at which time an analysis for NCO content showed the level of NCO to be below 100 p.p.m. One gram of p,p'-diphenylmethane diisocyanate was then added to the flask. The temperature of the reaction mixture was maintained for 1 hour at which time the NCO content analyzed below 100 p.p.m. A second gram of p,p'-diphenylmethane diisocyanate was added to the reaction flask which was maintained at a temperature of 60° C. An hour later a third gram of p,p'-diphenylmethane diisocyanate was added. One hour after the third addition 247 grams of methyl ethyl ketone and 0.1 gram of methanol were added to the reaction mixture under agitation. There was obtained a MEK solution of poly(oxycaproyl)-polyurethane product which, at 20 weight percent concentration in MEK, possessed a solution viscosity of 13,000 centipoises and a reduced viscosity of 1.36.

EXAMPLE 6

To a flask equipped with a thermometer, stirrer, reflux condenser, feed tank and nitrogen purge there were added Polyol A (226.9 grams, 0.116 mole), 1,4-butanediol (5.25 grams, 0.058 mole), ethylene glycol (3.62 grams, 0.058 mole), dibutyltin dilaurate (0.03 gram), and 400 grams of anhydrous methyl ethyl ketone. The mixture was heated to about 60° C. and p,p'-diphenylmethane diisocyanate (57.3 grams, 0.228 mole) was added over a fifteen minute period. At the end of the addition 40 grams of MEK was used to rinse any traces of reactants from the feed tank into the reaction flask. The temperature of the reaction was maintained at about 60° C. for one hour at which time an analysis for NCO content showed the level of NCO to be below 100 parts per million. One gram of p,p'-diphenylmethane diisocyanate was then added to the flask. The temperature of the reaction mixture was maintained for 1 hour at which time the NCO content analyzed below 100 p.p.m. A second gram of p,p'-diphenylmethane diisocyanate was added to the reaction flask which was maintained at a temperature of 60° C. An hour later a third gram of p,p'-diphenylmethane diisocyanate was added. One hour after the third addition 247 grams of methyl ethyl ketone and 0.1 gram of methanol were added to the reaction mixture under agitation. There was obtained a MEK solution of poly(oxycaproyl)poly-urethane product which, at 20 weight percent concentration in MEK, possessed a solution viscosity of 9,000 centipoises and a reduced viscosity of 1.50.

EXAMPLE 7

To a flask equipped with a thermometer, stirrer, reflux condenser, feed tank and nitrogen purge there were added Polyol A (225.3 grams, 0.116 mole), 1,6-hexanediol (6.88 grams, 0.0583 mole), 1,4-butanediol (5.25 grams 0.58 mole), dibutyltin dilaurate (0.03 gram), and 401 grams of anhydrous methyl ethyl ketone. The mixture was heated to 60° C. and p,p'-diphenylmethane diisocyanate (57.3 grams, 0.228 mole) was added over a 25 minute period. At the end of the addition 40 grams of MEK was used to rinse any traces of reactants from the feed tank into the reaction flask. The temperature of the reaction flask was maintained at about 60° C. for one hour at which time an analysis for NCO content showed the level of NCO to be below 100 parts per million. One gram of p,p'-diphenylmethane diisocyanate was then added to the flask. The temperature was maintained at 60° C. for one hour at which time the NCO content analyzed below 100 p.p.m. A second gram of p,p'-diphenylmethane diisocyanate was added and an hour later a third one gram increment was added. One hour after the third addition 247 grams of MEK was added to the flask followed by a 0.5 gram addition of p,p'-diphenylmethane diisocyanate. The temperature was maintained at 60° C. for another hour followed by the addition of 0.1 gram of methanol. The reaction mixture was stirred for 10 minutes and discharged. There was obtained a MEK solution of poly(oxycaproyl)-polyurethane product which, at 20 weight percent concentration in MEK, possessed a solution viscosity of 15,000 centipoises and a reduced viscosity of 1.32.

EXAMPLE 8

To a flask equipped with a thermometer, stirrer, reflux condenser, feed tank and nitrogen purge there were added Polyol A (225.3 grams, 0.116 mole), 1,6-hexanediol (13.76 grams, 0.116 mole), and 401 grams of anhydrous methyl ethyl ketone. The mixture was heated to about 60° C. and p,p'-diphenylmethane diisocyanate (57.3 grams, 0.228 mole) was added over a 15 minute period. At the end of the addition 40 grams of MEK was used to rinse any traces of reactants from the feed tank into the reaction flask. The temperature of the reactants was raised to about 80° C. and held for three hours.

The temperature was lowered to about 60° C. and dibutyltin dilaurate (0.015 gram) was added. Approximately one hour later, maintaining a reaction temperature of 60° C., the NCO content was analyzed and found to be less than 100 p.p.m. A one gram increment of p,p'-diphenylmethane diisocyanate was added to the flask. Thirty-five minutes later the NCO content again analyzed percent concentration in MEK, possessed a solution viscosity of 6050 centipoises and a reduced viscosity of 1.08.

The novel poly(oxycaproyl)-polyurethane solutions of Examples 1–9 were allowed to stand at room temperature for one month during which period of time their viscosities were measured and recorded. The data is set out in Table I below.

TABLE I

| Example number | Formulation [1] | Reduced viscosity | Viscosity (cps.) [2] | | |
|---|---|---|---|---|---|
| | | | 1 day | 1 week | 1 month |
| 1 | 1.0 polyol A/2.0 MDI/0.2 BDO/0.8 HDO | 1.04 | 2,350 | 4,000 | 5,100 |
| 2 | 1.0 Polyol A/2.0 MDI/0.1 BDO/0.9 HDO | 1.19 | 2,780 | 3,550 | 5,800 |
| 3 | 1.0 Polyol A/2.0 MDI/0.8 BDO/0.2 HDO | 1.30 | 4,800 | 12,100 | [4] 120,000 |
| 4 | 1.0 polyol A/2.0 MDI/0.5 HDO/0.5 EG [3] | 1.22 | 5,600 | 10,800 | 15,000 |
| 5 | 1.0 Polyol A/2.0 MDI/0.7 BDO/0.3 EG | 1.36 | 13,000 | 25,000 | 39,000 |
| 6 | 1.0 Polyol A/2.0 MDI/0.5 BDO/0.5 EG [3] | 1.50 | 9,000 | 16,900 | 22,000 |
| 7 | 1.0 Polyol A/2.0 MDI/0.5 BDO/0.5 HDO | 1.32 | 15,000 | 18,000 | 20,000 |
| 8 | 1.0 Polyol A/2.0 MDI/1.0 HDO | 1.29 | [5] 52,000 | 56,500 | [4] 136,000 |
| 9 | 1.0 Polyol A/2.0 MDI/0.2 BDO/0.8 EG | 1.08 | 6,050 | 10,800 | 16,300 |

[1] Formulation expressed in equivalent weight ratios.
[2] Brookfield Viscosity at 25°C., in centipoises.
[3] Soluble in acetone and 50 acetone/50 MEK mixture.
[4] Gel.
[5] Hazy.

below 100 p.p.m., and another one gram of p,p'-diphenylmethane diisocyanate was added to the flask. The reaction temperature was held at 60° C. for an hour and then shut down overnight. The next morning the NCO content was analyzed and found to be less than 100 p.p.m. MEK (247 grams) was added to the flask and the temperature was raised to 60° C. Dibutyltin dilaurate (0.015 gram) was added and the temperature was maintained at 60° C. for 30 minutes at which time another one gram increment of p,p'-diphenylmethane diisocyanate added to the flask. An hour later, methanol (0.1 gram) was added to the flask. The resulting mixture was stirred well and discharged. There was obtained a MEK solution of poly(oxycaproyl)-polyurethane product which, at 20 weight percent concentration in MEK, possessed a solution viscosity of 52,000 centipoises and a reduced viscosity of 1.29. This solution was hazy in appearance and upon standing at 25° C. for a period of one month gave a gel.

EXAMPLE 9

To a flask equipped with a thermometer, stirrer, reflux condenser, feed tank and nitrogen purge there were added Polyol A (226.9 grams, 0.116 mole), 1,4-butanediol (2.10 grams, 0.023 mole), ethylene glycol (5.79 grams, 0.093 mole), dibutyltin dilaurate (0.03 gram), and 405 grams of anhydrous MEK. The mixture was heated to about 60° C. and p,p'-diphenylmethane diisocyanate (57.3 grams, 0.228 mole) was added over a 20 minute period. At the end of the addition 40 grams of MEK was used to rinse any traces of the reactants from the feed tank into the reaction flask. The temperature of the reaction mixture was maintained at about 60° C. for one hour at which time an analysis for NCO content showed the level of NCO to be below 100 p.p.m. One gram of p,p'-diphenylmethane diisocyanate was then added to the flask. The temperature was maintained at about 60° C. for 30 minutes at which time the NCO content again analyzed below 100 p.p.m. A second gram of p,p'-diphenylmethane diisocyanate was added to the flask. Two hours later 247 grams of MEK was added to the flask followed by 0.05 gram of methanol. The resulting mixture was stirred well and discharged. There was obtained a MEK solution of poly-(oxycaproyl)-polyurethane product which, at 20 weight

EXAMPLES 10–18

In Examples 10–18 below, the general procedure for preparing polyurethane products was as follows. To a 500 milliliter reaction flask equipped with heating mantle, stirrer, thermometer, and vacuum inlet tube, there were added the poymeric diols, followed by heating to a temperature of from about 120° C. to about 140° C. for a period of 15 to 30 minutes at 5 mm. of Hg to remove moisture and dissolved gases therefrom. After this, the pressure was increased to atmospheric and the poly(oxycaproyl) diol component was then added to a heated mold maintained at 140° C. The mixture of alpha, omega-alkanediols was added thereto and the resulting admixture was maintained at 140° C. The diisocyanate compound (MDI) was added to said admixture under vigorous stirring for about one minute and this agitated reaction mixture was placed in an air-oven at 140° C. for 3 hours. The ratio of equivalents of hydroxyl:isocyanato:hydroxyl from the poly(oxycaproyl) diol:diisocyanate compound: alpha, omega-alkanediols, respectively, was 1:2:1. There were obtained thermoplastic polyurethane products. Thereafter, attempts to prepare 5 weight percent MEK solutions of said products at room temperature were undertaken. The results are recorded in Table II below.

TABLE II

| Example Number | Alkanediol extender | Reduced viscosity | MEK solubility |
|---|---|---|---|
| 10 | None | 0.89 | Yes. |
| 11 | Ethylene glycol | 0.85 | No. |
| 12 | 1,3-propanediol | 1.19 | No. |
| 13 | 1,4-butanediol | 1.05 | No. |
| 14 | 1,5-pentanediol | 0.98 | No. |
| 15 | 1,8-octanediol | 0.88 | No. |
| 16 | 1,9-nonanediol | 1.08 | No. |
| 17 | 1,10-decanediol | 1.01 | No. |
| 18 | 1,12-dodecanediol | 0.99 | No. |

EXAMPLES 19–29

The polyurethane solutions of Examples 1, 2, 4, 5, 6, 7, and 9 were tested for peel strength in accordance with ASTM D-1876-69. Four commercially available polyurethane solutions useful as adhesives were likewise subjected to the same test. The results are set out in Table III below.

TABLE III

| Example Number | Formulation | Peel strength (lbs./in.) at— | | | | |
|---|---|---|---|---|---|---|
| | | 73° F. | 140° F. | 180° F. | 212° F. | 230° F. |
| 29 | (1) | | 23 | 2 | 0.5 | 0.4 |
| 20 | (2) | 45(SF) | 40(SF) | 10 | 0.8 | 0.5 |
| 11 | (3) | 32 | 30 | 10 | 1.5 | 0.8 |
| 22 | (4) | 20 | 20 | 17 | 10 | 4 |
| 23 | (5) | 52 | 44 | 44(SF) | 15 | 4 |
| 24 | (6) | 45 | 43(SF) | 16 | 1.7 | 1.2 |
| 25 | (7) | 37 | 35 | 25 | 15 | 10 |
| 26 | (8) | 34 | 1 | 0 | 0 | 0 |
| 27 | (9) | 33 | 3 | 0.5 | 0 | 0 |
| 28 | (10) | 28 | 3 | 0.5 | 0.4 | 0 |
| 29 | (11) | 40 | 17 | 1 | 0.6 | 0 |

NOTES:
(1) Formulation of Example 1 supra.
(2) Formulation of Example 2 supra.
(3) Formulation of Example 4 supra.
(4) Formulation of Example 5 supra.
(5) Formulation of Example 6 supra.
(6) Formulation of Example 7 supra.
(7) Formulation of Example 9 supra.
(8) Desmocoll 400. A commercially available thermoplastic polyurethane solution by Bayer prepared by reacting MDI, BDO, and poly(1,4-butylene adipate) diol.
(9) Estane 5711: A commercially available thermoplastic polyurethane solution by B. F. Goodrich prepared by reacting MDI, BDO, and poly(1,4-butylene adipate) diol.
(10) Estane 5712: A commercially available thermoplastic polyurethane solution by B. F. Goodrich prepared by reacting MDI, BDO, and poly(1,4-butylene adipate) diol.
(11) Estane 5713: A commercially available thermoplastic polyurethane solution by B. F. Goodrich prepared by reacting MDI, BDO, and poly(1,4-butylene adipate) diol.

What is claimed is:

1. Thermoplastic poly(oxycapropyl)-polyurethane polymeric products which exhibit improved elevated temperature performance and which are soluble in methyl ethyl ketone at room temperature, said products being comprised essentially of structural units of the formula:

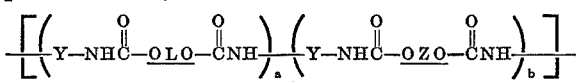

(i) wherein OLO represents the bivalent organic radical which results from the removal of both hydroxylic hydrogen atoms from poly(oxycapropyl) diol which has a weight average molecular weight in the range of from about 500 to about 4000 and which is characterized by the recurring structural linear unit of the formula:

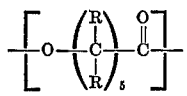

wherein each R individually is of the group consisting of hydrogen and lower alkyl, with the proviso that no more than three R substituents are groups other than hydrogen;
(ii) wherein Y represents the bivalent organic radical which results from the removal of both isocyanato groups from p,p-diphenylmethane diisocyanate;
(iii) wherein OZO represents bivalet organic radicals which result from the removal of the hydroxylic hydrogen atoms from a mixture comprising alpha, omega-C$_2$-C$_{12}$ alkanediols, the proportions being such that said mixture comprises from about 25 to about 75 weight percent of one alpha, omega-alkanediol component with the remainder being comprised of at least one different alpha, omega-alkenediol, with the proviso that when one of the alpha, omega-alkanediol components is 1,6-hexanediol, then said mixture comprises from about 25 to about 90 weight percent 1,6-hexanediol therein, and with the further proviso that when one of the alpha, omego-alkanediol components is ethylene glycol, then said mixture comprises from about 25 to about 80 weight percent ethylene glycol therein;
(iv) wherein the over-all molar ratio of the number of (OLO+OZO) to Y radicals in said products is about one;
(v) wherein $a$ is an integer greater than zero;
(vi) wherein the over-all ratio of the number of OLO to Y radicals in said product is in the range of from about 1:1.5 to about 1:5; and
(vii) wherein the over-all ratio of the number of OLO to OZO radicals in said product is in the range of from about 1:0.5 to about 1:4.

2. The thermoplastic poly(oxycaproyl)-polyurethane polymeric products of claim 1 wherein said recurring unit has the formula

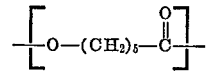

3. The thermoplastic poly(oxycaproyl)-polyurethane products of claim 2 wherein said poly(oxycaproyl) diol has a weight average molecular weight in the range of from about 800 to about 3500; wherein the over-all ratio of the number of OLO to Y radicals is in the range of from about 1:1.7 to about 1:2.5; and wherein the over-all ratio of the number of OLO to OZO radicals is in the range of from about 1:0.7 to about 1:1.5.

4. Thermoplastic poly(oxycaproyl)-polyurethane polymeric products dissolved in organic ketonic solvents at room temperature (A) wherein said ketonic solvents are of the groups consisting of methyl ethyl ketone, acetone, and mixtures of methyl ethyl ketone and methyl C$_1$-C$_4$ alkyl ketone; (B) wherein said poly(oxycaproyl)-polyurethane polymeric products are comprised essentially of the structural units of the formula:

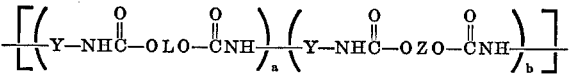

(i) wherein OLO represents the bivalent organic radical which results from the removal of both hydroxylic hydrogen atoms from poly(oxycaproyl) diol which has a weight average molecular weight in the range of from about 500 to about 4000 and which is characterized by the recurring structural linear unit of the formula:

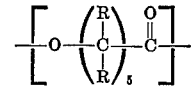

wherein each R individually is of the group consisting of hydrogen and lower alkyl, with the proviso that no more than three R substituents are groups other than hydrogen;
(ii) wherein Y represents the bivalent organic radical which results from the removal of both isocyanato groups from p,p'-diphenylmethane diisocyanate;
(iii) wherein OZO represents bivalent organic radicals which result from the removal of the hydroxylic hydrogen atoms from a mixture comprising alpha, omega-C$_2$-C$_{12}$ alkanediols, the proportions being such that such mixture comprises from about 25 to about 75 weight percent of one alpha, omega-alkanediol component with the remainder being comprised of at least one different alpha, omega-alkanediol, with the proviso that when one of the alpha, omega-alkanediol components is 1,6-hexanediol, then said mixture comprises from about 25 to about 90 weight percent 1,6-hexanediol therein, and with the further proviso that when one of the alpha, omega-alkanediol components is ethylene glycol, then said mixture comprises from about 25 to about 80 weight percent ethylene glycol therein;

(iv) wherein the over-all molar ratio of the number of (OLO+OZO) to Y radicals in said products is about one;
(v) wherein $a$ is an integer greater than zero;
(vi) wherein $b$ is an integer greater than zero;
(vii) wherein the over-all ratio of the number of OLO to Y radicals in said product is in the range of from about 1:1.5 to about 1:5; and
(viii) wherein the over-all ratio of the number of OLO to OZO radicals in said product is in the range of from about 1:0.5 to about 1:4.

5. The thermoplastic poly(oxycaproyl)-polyurethane polymeric products of claim 4 wherein said recurring unit has the formula

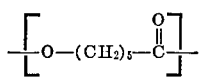

References Cited
UNITED STATES PATENTS
2,755,266   7/1956   Brenschede.
3,523,101   8/1970   Reuter.
3,660,357   5/1972   Kolycheck _____ 260—77.5

OTHER REFERENCES
"NIAX" Caprolactone Polyols, Union Carbide Corp., New York (1971), pp. i, 1, 2 and 21–30.

DONALD E. CZAJA, Primary Examiner

H. S. COCKERAM, Assistant Examiner

U.S. Cl. X.R.

260—2.5 AN, 77.5 AN, 77.5 AB, 77.5 AC

UNITED STATES PATENT OFFICE
CERTIFICATE OF CORRECTION

Patent No. 3,761,439  Dated September 25, 1973

Inventor(s) R. J. Ward and F. E. Critchfield

It is certified that error appears in the above-identified patent and that said Letters Patent are hereby corrected as shown below:

Column 14, delete lines 2-7 and insert therefor the following:

---(vi) wherein $\underline{b}$ is an integer greater than zero;

(vii) wherein the over-all ratio of the number $\underline{OLO}$ to $\underline{Y}$ radicals is said product is in the range of from about 1:1.5 to about 1:5; and (viii) wherein the over-all ratio of the number $\underline{OLO}$ to $\underline{OZO}$ radicals in said product is in the range of from about 1:0.5 to about 1:4.---.

Signed and sealed this 7th day of January 1975.

(SEAL)
Attest:

McCOY M. GIBSON JR.
Attesting Officer

C. MARSHALL DANN
Commissioner of Patents